United States Patent
Reuter

(10) Patent No.: US 6,533,605 B1
(45) Date of Patent: Mar. 18, 2003

(54) BOTTOM PLATE FIXING DEVICE FOR A SWITCHGEAR CABINET

(75) Inventor: Wolfgang Reuter, Burbach (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/555,737

(22) PCT Filed: Dec. 3, 1998

(86) PCT No.: PCT/EP98/07845

§ 371 (c)(1),
(2), (4) Date: Jun. 2, 2000

(87) PCT Pub. No.: WO99/30395

PCT Pub. Date: Jun. 17, 1999

(30) Foreign Application Priority Data

Dec. 5, 1997 (DE) .......................................... 197 54 130

(51) Int. Cl.[7] .............................. H01R 4/24; H01R 4/26; H01R 11/20
(52) U.S. Cl. ....................................... 439/431; 439/803
(58) Field of Search ................................ 439/792, 431, 439/92, 433, 803, 435, 532, 814, 444, 432

(56) References Cited

U.S. PATENT DOCUMENTS

| | | | | |
|---|---|---|---|---|
| 2,580,321 A | * | 12/1951 | Rees ........................... | 439/444 |
| 3,363,219 A | * | 1/1968 | Hubbard et al. ............. | 439/433 |
| 4,269,465 A | * | 5/1981 | Mueller ....................... | 439/431 |
| 4,513,923 A | * | 4/1985 | Ulics .......................... | 242/55.2 |
| 4,828,504 A | | 5/1989 | Franks, Jr. ................... | 439/92 |
| 5,032,092 A | * | 7/1991 | Linn ........................... | 439/814 |
| 5,094,622 A | | 3/1992 | Auclair ........................ | 439/92 |
| 5,160,271 A | * | 11/1992 | Franks, Jr. ................... | 439/92 |
| 5,491,892 A | * | 2/1996 | Fritz et al. ................... | 439/92 |
| 5,807,143 A | | 9/1998 | Wagener ..................... | 439/803 |

* cited by examiner

Primary Examiner—Javaid Nasri
(74) Attorney, Agent, or Firm—Pauley Petersen Kinne & Erickson

(57) ABSTRACT

A bottom plate fixing device for a switchgear cabinet, whereby an edge of at least one bottom plate is placed on a support flange of a bottom frame of the switchboard cabinet and is preloaded by at least one fastening clip. The clip has two parallel legs which are held on a connecting section, whereby the first leg engages behind the support flange of the bottom plate and the other leg holds a screw in a thread. The screw can be tightened against the edge of the bottom plate. The bottom plate and the bottom frame can be reliably placed on the same electrical level by supporting the first leg on the support flange by cutting and/or sharpening contact elements, and such that the screw is in electrically conductive contact with the edge of the bottom plate.

12 Claims, 2 Drawing Sheets

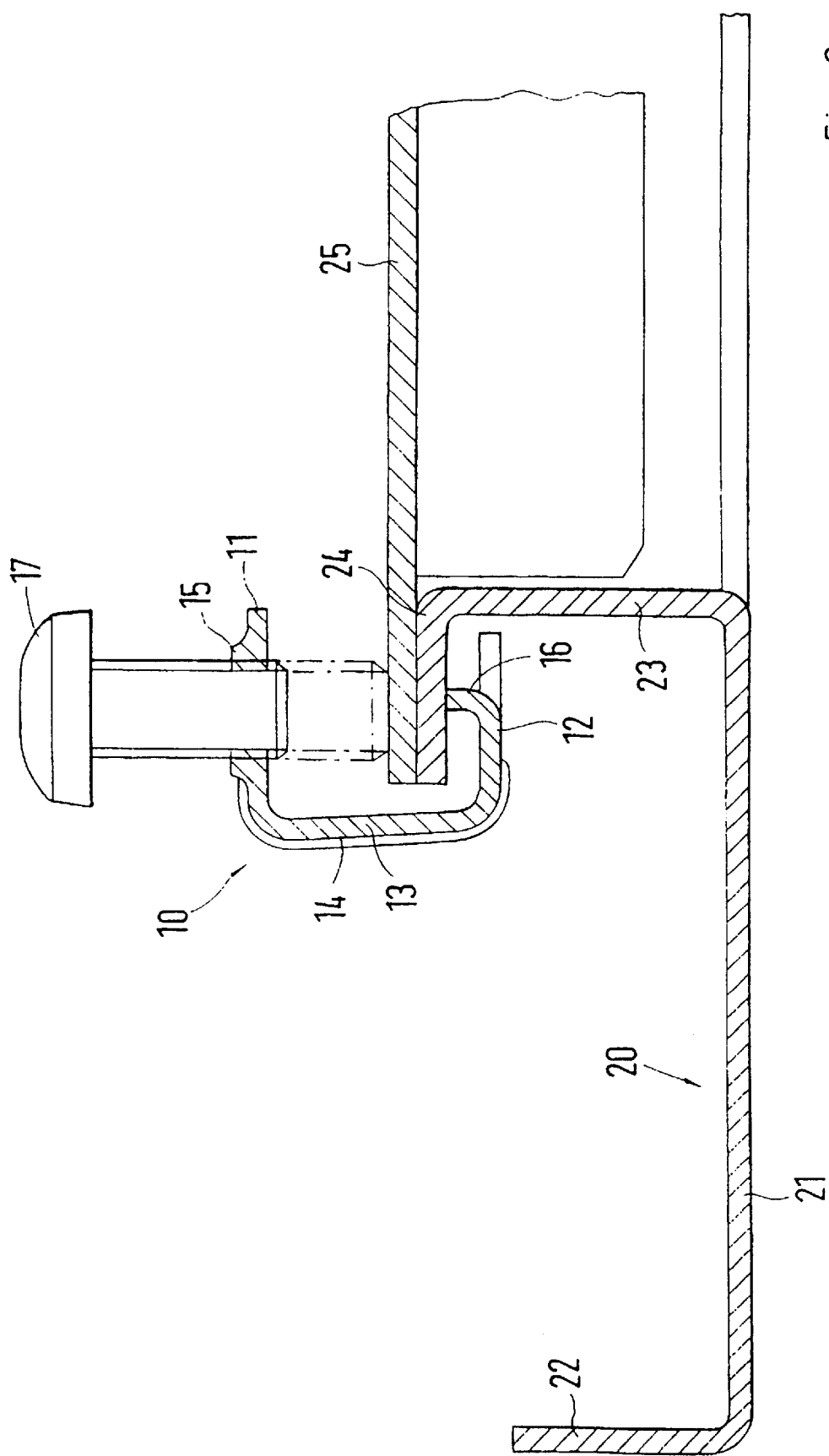

BOTTOM PLATE FIXING DEVICE FOR A SWITCHGEAR CABINET

BACKGROUND OF THE INVENTION

1. Field of the Invention

This invention relates to a fastening for a bottom plate of a switchgear cabinet, wherein an edge of at least one bottom plate is placed on a support flange of a bottom frame of the switchgear cabinet and is clamped together with at least one tightening clamp, wherein the tightening clamp has two legs which are parallel with each other and are held on a connecting section, wherein the first leg grasps the support flange of the bottom from behind, and wherein the other leg holds a screw in a thread, which can be tightened against the edge of the bottom plate.

2. Description of Prior Art

Such a bottom plate fastening is known from German Patent Reference DE 44 46 223 C1. The bottom frame of the switchgear cabinet is assembled from four profiled sections. The profiled sections are essentially embodied in a U-shape, wherein two vertically projecting profiled sides are connected to a horizontal support section. The edges of the profiled sides are beveled. A horizontal support flange is thus created on the profiled section located in the interior, on which bottom plates can be laid flat. The edges of the bottom plates can be connected with the support flange with tightening clamps. The tightening clamps are designed as U-shaped components with two parallel legs.

The edge and the support flange are located between the two legs. One of the legs has a screw, by which the bottom plate can be clamped together with the support flange on the second leg.

SUMMARY OF THE INVENTION

It is one object of this invention to produce a fastening of the type mentioned at the outset, wherein the bottom plate and the bottom frame can be dependably placed on a same electrical level.

This object is achieved with a first leg supported by bezels and/or tips of contacting elements on the support flange, wherein the screw is in an electrically conducting contact with the edge of the bottom plate.

When the tightening clamp is tightened, the bezels and/or tips dig into the support flange. In particular, a layer of lacquer on the support flange can be penetrated, to assure electrical contact between the tightening clamp and the support flange. The electrically conducting connection with the bottom plate is produced via the screw. When screwed in, the screw contacts the bottom plate. Because of tightening of the screw, the screw rubs across the surface of the bottom plate and thus is able to create an assured electrical contact.

In accordance with a preferred embodiment of this invention, at least two contacting elements, which are embodied as tongues, are stamped out of the first leg and are bent in a direction toward the support flange. The ends of the tongues are cut off transversely with respect to their longitudinal sides, so that bezels are formed. A cost-effective production of the tightening clamps is possible with this simple step.

Stiffening of the tightening clamps is achieved if the connecting section has reinforcement ribs, which extend vertically in relation to the legs. Thus the connecting section is not bent when the screw is tightened.

Also, the reinforcement ribs extend past the edge areas formed between the connecting section. This simple step prevents the legs from being bent open when the tightening clamp is tightened. Large clamping forces can be transferred to the bottom plate and the support flange by such a rigid tightening clamp.

In another embodiment of this invention, the tightening clamp is formed in a U-shape from a stamped bent component, and the leg facing the bottom plate has a bulge-like thickened place into which the screw receptacle for the screw is cut. It is thus possible for the tightening clamp to be made of a relatively thin sheet metal material. A sufficient length of the screw thread is assured due to the thickening.

The front of the screw can have protrusions for an improved electrical contact between the bottom plate and the screw. These dig into the surface of the bottom plate when the screw is tightened.

BRIEF DESCRIPTION OF THE DRAWINGS

This invention will be explained in greater detail in view of an exemplary embodiment represented in the drawings wherein:

FIG. 3 is a cross-sectional view of the tightening clamp shown in FIGS. 1 and 2, in a mounted position.

DESCRIPTION OF PREFERRED EMBODIMENTS

Figure 1:
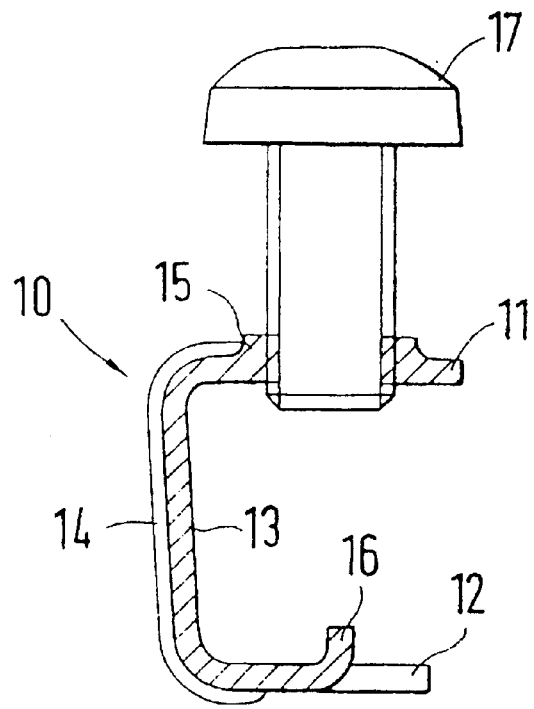
FIG. 1 is a cross-sectional side view of a tightening clamp with a screw.
Figure 2:
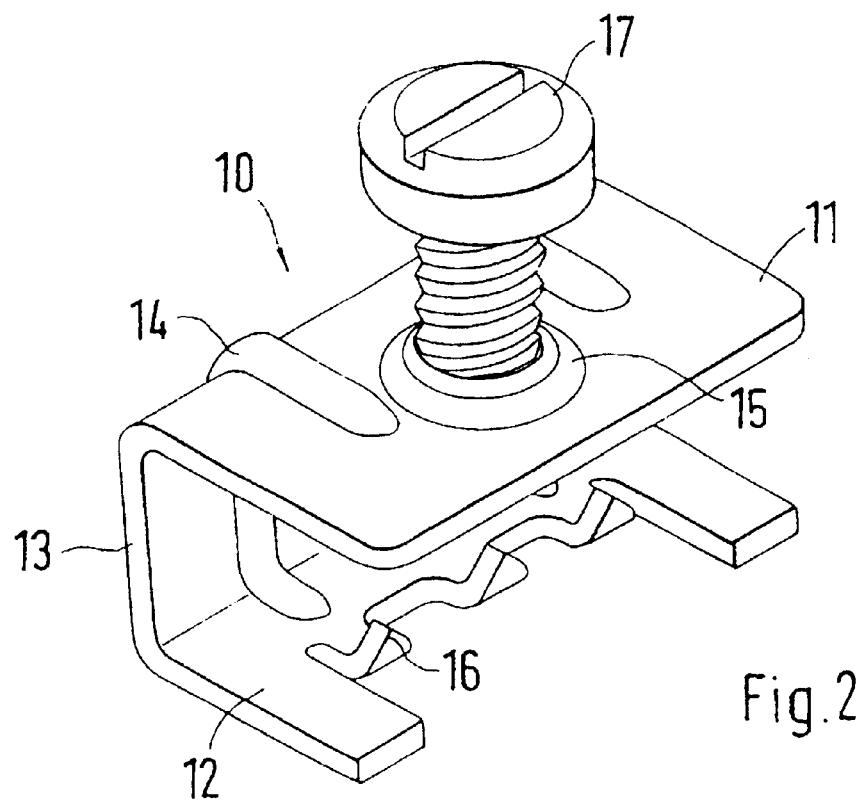
FIG. 2 is a perspective view of the tightening clamp shown in FIG. 1.

A tightening clamp 10 is shown in FIG. 1, which is essentially U-shaped from a connecting section 13 and two legs 11, 12 connected with it, which are parallel with respect to each other. Here, the upper leg 11 has a bulge-like thickening 15. A threaded receptacle passes through the thickening 15. In this case the axis of the thread extends vertically with respect to the leg 1. A screw 17 can be screwed into the threaded receptacle. The lower leg 12 has three contacting elements 16. Details of the arrangement of the contacting elements are shown in FIG. 2. The contacting elements are stamped in a tongue-like manner out of the leg 12. In this case the ends of the contacting elements are cut off obliquely to their longitudinal direction, so that triangular tips result. In the area of their tips, the contacting elements 16 are bent in the direction toward the upper leg 11. Sharp-edged bezels of the contacting elements 16 project into the receiving space surrounded by the tightening clamp 10. The tightening clamp 10 has three contacting elements 16. The center contact element 16 is aligned with the center longitudinal axis of the screw 17. The front of the screw can have protrusions for an improved electrical contact between the bottom plate and the screw. The protrusions dig into the surface of the bottom plate when the screw is tightened.

Reinforcement ribs 14 stiffen the tightening clamp 10. The reinforcement ribs 14 extend vertically with respect to the legs 11, 12 over the entire height of the connecting section 13. Adjoining the connecting section 13, the ribs 14 are conducted over the edge area resulting between the connecting section 13 and the legs 11, 12, and partially extend over the legs 11, 12. The reinforcement ribs 14 are in the form of moldings, which are pressed out of the material of the tightening clamp 10.

An exemplary application of the tightening clamp 10 of this invention is shown in FIG. 3. A bottom frame 20 is shown in this drawing, which has a horizontal support section 21. Two profiled sides 22, 23 are bent at right angles off this support flange 21. A support flange 24 is bent off the inner profiled side 23. An edge of a bottom plate 25 can be placed on the support flange 24. The bottom plate 25 can be clamped together with the support flange 24 by means of several tightening clamps 10. In this case the U-shaped tightening clamp is mounted in such a way that the edge of the bottom plate 25 and the support flange 24 rest between the two legs 11, 12. When the screw 17 is tightened, the bottom plate 25 and the support flange 24 are pressed against contacting elements 16, as shown by the dashed lines of the screw 17, in FIG. 3. Because the screw 17 is charged with a clamping force, the bezels of the contacting elements 16 dig into the underside of the support section 24. An electrically conducting connection is thus made between the tightening clamp 10 and the bottom frame 20. At the same time the screw 17 is placed on the electrically conducting upper surface of the bottom plate 25, so that an electrical connection is also generated there. Thus the bottom plate 25 and the bottom frame 20 are placed on the same electrical potential.

What is claimed is:

1. In a fastening for at least one bottom plate of a switchgear cabinet, wherein an edge of the at least one bottom plate is placed on a support flange of a bottom frame of the switchgear cabinet and is clamped together with the support flange by at least one tightening clamp, wherein the at least one tightening clamp has two legs parallel with each other and held on a connecting section, wherein a first leg of the legs grasps the support flange, and wherein a second leg of the legs holds a screw in a thread, wherein the screw can be tightened against the edge of the bottom plate, the improvement comprising:

the bottom plate and the support flange having contacting surfaces which are parallel to each other and parallel to the parallel legs of the tightening clamp, the first leg (12) supported by at least one of a plurality of bezels and a plurality of tips of a plurality of contacting elements (16) on the support flange (24);

at least two of the contacting elements (16) embodied as tongues and stamped out of the first leg (12) and bent in a direction toward the support flange (24), and ends of the tongues cut off transversely with respect to longitudinal sides of the tongues so that the bezels are formed; and the screw (17) in an electrically conducting contact with the edge of the bottom plate (25) and the plurality of tips in an electrically conducting contact with the support flange (24), the tightening clamp and screw being conductive, thereby placing the bottom plate and the support flange at the same electrical level.

2. In the fastening for the at least one bottom plate in accordance with claim 1, wherein the connecting section (13) has reinforcement ribs (14) which extend vertically with respect to the legs (11, 12) over the connecting section.

3. In the fastening for the at least one bottom plate in accordance with claim 2, wherein the reinforcement ribs (14) extend beyond edge areas formed between the connecting section (13) and the legs (11, 12).

4. In the fastening for the at least one bottom plate in accordance with claim 3, wherein the tightening clamp (10) is formed in a U-shape from a sheet metal stamped bent component, and the second leg (11) facing the at least one bottom plate (25) has a bulge thickening (15) into which a screw receptacle for the screw (17) is cut.

5. In the fastening for the at least one bottom plate in accordance with claim 4, wherein the screw (17) has protrusions on a front end of the screw (17) which is positioned on the bottom plate (25).

6. In the fastening for the at least one bottom plate in accordance with claim 1, wherein the tightening clamp (10) is formed in a U-shape from a sheet metal stamped bent component, and the second leg (11) facing the at least one bottom plate (24) has a bulge thickening (15) into which a screw receptacle for the screw (17) is cut.

7. In the fastening for the at least one bottom plate in accordance with claim 1, wherein the screw (17) has protrusions on a front end of the screw (17) which is positioned on the bottom plate (25).

8. In a fastening for at least one bottom plate of a switchgear cabinet, wherein an edge of the at least one bottom plate is placed on a support flange of a bottom frame of the switchgear cabinet and is clamped together with the support flange by at least one tightening clamp, wherein the at least one tightening clamp has two legs parallel with each other and held on a connecting section, wherein a first leg of the legs grasps the support flange, and wherein a second leg of the legs holds a screw in a thread, wherein the screw can be tightened against the edge of the bottom plate, the improvement comprising:

the bottom plate and the support flange having contacting surfaces which are parallel to each other and parallel to the parallel legs of the tightening clamp, the first leg (12) supported by at least one of a plurality of bezels and a plurality of tips of a plurality of contacting elements (16) on the support flange (24), the at least one of a plurality of bezels and an plurality of tips being formed from the first leg and bent in a direction towards the support flange, and the screw (17) in an electrically conducting contact with the edge of the bottom plate (25) and the plurality of tips in an electrically conducting contact with the support flange (24), the tightening clamp and screw being conductive, thereby placing the bottom plate and the support flange at the same electrical level; and reinforcement ribs (14) extending vertically with respect to the legs (11, 12) over the connecting section.

9. In the fastening for the at least one bottom plate in accordance with claim 8, wherein the reinforcement ribs (14) extend beyond edge areas formed between the connecting section (13) and the legs (11, 12).

10. In the fastening for the at least one bottom plate in accordance with claim 8, wherein at least two of the contacting elements (16) are embodied as tongues and are stamped out of the first leg (12) and are bent in a direction toward the support flange (24), and ends of the tongues are cut off transversely with respect to longitudinal sides of the tongues so that the bezels are formed.

11. In the fastening for the at least one bottom plate in accordance with claim 8, wherein the tightening clamp (10) is formed in a U-shape from a stamped bent component, and the second leg (11) facing the at least one bottom plate (24) has a bulge thickening (15) into which a screw receptacle for the screw (17) is cut.

12. In the fastening for the at least one bottom plate in accordance with claim 8, wherein the screw (17) has protrusions on a front end of the screw (17) which is positioned on the bottom plate (25).

* * * * *